(12) United States Patent
Roh

(10) Patent No.: US 9,876,198 B2
(45) Date of Patent: Jan. 23, 2018

(54) RECHARGEABLE BATTERY

(71) Applicant: Samsung SDI Co., Ltd, Yongin-si, Gyeonggi-do (KR)

(72) Inventor: Sae-Weon Roh, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 465 days.

(21) Appl. No.: 14/091,710

(22) Filed: Nov. 27, 2013

(65) Prior Publication Data

US 2014/0170474 A1 Jun. 19, 2014

(30) Foreign Application Priority Data

Dec. 18, 2012 (KR) .................. 10-2012-0148088
Feb. 1, 2013 (KR) .................. 10-2013-0011990

(51) Int. Cl.
*H01M 2/02* (2006.01)

(52) U.S. Cl.
CPC .................. *H01M 2/0217* (2013.01)

(58) Field of Classification Search
CPC ......... H01M 2/00; H01M 2/0217; H01M 2/02
See application file for complete search history.

(56) References Cited

U.S. PATENT DOCUMENTS

| | | | |
|---|---|---|---|
| 3,816,181 A | 6/1974 | Buckethal | |
| 6,333,124 B1 | 12/2001 | Moriwaki et al. | |
| 2002/0197529 A1 | 12/2002 | Moriwaki et al. | |
| 2003/0077510 A1* | 4/2003 | Ohmura ................ | C23C 28/021 429/176 |
| 2005/0287442 A1* | 12/2005 | Kim .................... | H01M 10/052 429/326 |
| 2010/0248015 A1* | 9/2010 | Cha .................... | H01M 2/0202 429/176 |
| 2011/0045340 A1 | 2/2011 | Kwak | |
| 2011/0081573 A1 | 4/2011 | Kim et al. | |

FOREIGN PATENT DOCUMENTS

| | | |
|---|---|---|
| CN | 1352810 A | 6/2002 |
| CN | 1728436 A | 2/2006 |
| CN | 1983671 A | 6/2007 |
| CN | 101083311 A | 12/2007 |
| EP | 0 791 970 A1 | 8/1997 |
| JP | 11-54095 A | 2/1999 |
| JP | 2007-323845 | * 12/2007 |
| JP | 4402076 B2 | 11/2009 |
| KR | 10-2001-0039432 A | 5/2001 |
| KR | 20-0326873 Y1 | 9/2003 |

OTHER PUBLICATIONS

Machine translation of JP 2007-323845, published on Dec. 13, 2007 (Year: 2007).*
Korean Notice of Allowance dated Aug. 27, 2014 for Korean Patent Application No. KR 10-2013-0011990, which corresponds to captioned U.S. Appl. No. 14/091,710.
Extended European Search Report dated Apr. 1, 2014 for European Patent Application No. EP 13 198 228.2.
Communication pursuant to Article 94(3) EPS—European Examination Report dated Apr. 1, 2016 for European Patent Application No. EP 13 198 228.2, which shares priority of Korean Patent Application No. KR 10-2012-0148088 with subject U.S. Appl. No. 14/091,710.
Korean Office Action dated Jan. 29, 2014 for Korean Patent Application No. KR 10-2013-0011990, which corresponds to captioned U.S. Appl. No. 14/091,710.
First Chinese Office Action dated Feb. 4, 2017 for Chinese Patent Application No. CN 201310674605.4, and which shares priority of Korean Patent Application Nos. KR 10-2012-0148088 and KR 10-2013-0011990 with subject U.S. Appl. No. 14/091,710.
Second Chinese Office Action dated Aug. 16, 2017 for Chinese Patent Application No. CN 201310674605.4, which shares priority of Korean Patent Application No. KR 10-2012-0148088 and KR 10-2013-0011990 with subject U.S. Appl. No. 14/091,710. References referred to in the Office Action are previously of record in the subject application.
The Third Chinese Office Action dated Nov. 28, 2017 for Chinese Patent Application No. CN 201310674605.4 which shares priority of Korean Patent Application No. KR 10-2012-0148088, filed Dec. 18, 2012 and KR 10-2013-0011990, filed Feb. 1, 2013, with subject U.S. Appl. No. 14/091,710. References cited in the Third Chinese Office Action are previously disclosed in the subject U.S. Appl. No. 14/091,710.

* cited by examiner

*Primary Examiner* — Anca Eoff
(74) *Attorney, Agent, or Firm* — Knobbe Martens Olson & Bear LLP

(57) ABSTRACT

A rechargeable battery is disclosed. In one aspect, the battery includes an electrode assembly that comprises a first electrode plate, a second electrode plate, and a separator interposed between the first and second electrode plates. The battery also includes a can having an opening and accommodating the electrode assembly therein, wherein the can comprises a plurality of corner units, wherein at least one of the corner units is rounded, and wherein the outer radius of curvature of the at least one corner unit is greater than the inner radius of curvature thereof. The battery further includes a cap plate substantially sealing the opening of the can.

14 Claims, 5 Drawing Sheets

RECHARGEABLE BATTERY

RELATED APPLICATIONS

This application claims the benefit of Korean Patent Application No. 10-2012-0148088, filed on Dec. 18, 2012, and Korean Patent Application No. 10-2013-0011990, filed on Feb. 1, 2013, in the Korean Intellectual Property Office, the disclosures of which are incorporated herein in their entirety by reference.

BACKGROUND

1. Field

The described technology generally relates to rechargeable batteries.

2. Description of the Related Technology

Unlike a primary battery that is non-rechargeable, a secondary (rechargeable) battery can be charged and discharged multiple times, and is widely used in various high-tech electronic devices such as mobile phones, personal digital assistants (PDAs), or notebook computers.

SUMMARY

One inventive aspect is rechargeable batteries having a strong resistance to effects of dropping or external impacts.

Another aspect is a rechargeable battery including: an electrode assembly that includes a first electrode plate, a second electrode plate, and a separator interposed between the first and second electrode plates; a can that includes an opening on a side thereof to allow insertion of the electrode assembly, the can accommodating the electrode assembly therein; and a cap plate for sealing the opening of the can, wherein at least one corner unit of corner units of the can has a round shape, and an outer radius of curvature of the at least one corner unit having the round shape is greater than an inner radius of curvature thereof.

The at least one corner unit having the round shape may be at least one of corner units that surround a bottom surface located on an opposite side to the cap plate of the can.

The can may include a first surface that extends in a first direction from the at least one corner unit having the round shape, and a second surface that extends in a second direction from the at least one corner unit having the round shape, wherein a thickness of the first surface is greater than a thickness of the second surface.

The first surface may be the bottom surface located opposite to the cap plate of the can, and the second surface may be a side surface that is located between the cap plate and the bottom surface of the can and is approximately perpendicularly bent with respect to the bottom surface.

The can has a hexahedral shape as a whole and includes an opening that is formed at a position corresponding to an upper surface thereof, the can including: the bottom surface located on an opposite side to the cap plate; a first side surface that is located between the cap plate and the bottom surface and is approximately perpendicularly bent with respect to the bottom surface; a second side surface that is located between the cap plate and the bottom surface, is approximately perpendicularly bent with respect to the bottom surface, and faces the first side surface; a third side surface that is located between the cap plate and the bottom surface and is approximately perpendicularly bent with respect to the bottom surface; and a fourth side surface that is disposed between the cap plate and the bottom surface, is approximately perpendicularly bent with respect to the bottom surface, and faces the third side surface.

The bottom surface may have a thickness greater than that of each of the first side surface, the second side surface, the third side surface, and the fourth side surface.

The bottom surface may have a thickness in a range from about 0.57 mm to about 0.63 mm, and the first side surface, the second side surface, the third side surface, and the fourth side surface respectively may have a thickness in a range from about 0.28 mm to about 0.32 mm.

The at least one corner unit having the round shape, may include: a first corner unit that has a round shape, is formed at a location where the first side surface abuts to the bottom surface, and has an outer radius of curvature greater than an inner radius of curvature; and a second corner unit that has a round shape, is formed at a location where the second side surface abuts to the bottom surface, and has an outer radius of curvature greater than an inner radius of curvature.

The at least one corner unit having the round shape, may include: a third corner unit that has a round shape, is formed at a location where the third side surface abuts to the bottom surface, and has an outer radius of curvature greater than an inner radius of curvature; and a fourth corner unit that has a round shape, is formed at a location where the fourth side surface abuts to the bottom surface, and has an outer radius of curvature greater than an inner radius of curvature.

The at least one corner unit having the round shape, may include: a first corner unit that has a round shape, is formed at a location where the first side surface abuts to the bottom surface, and has an outer radius of curvature greater than an inner radius of curvature; and a second corner unit that has a round shape, is formed at a location where the second side surface abuts to the bottom surface, and has an outer radius of curvature greater than an inner radius of curvature.

The inner radius of curvature may be in a range from about 0.4 mm to about 0.6 mm.

The outer radius of curvature may be in a range from about 1.0 mm to about 1.2 mm.

Another aspect is a rechargeable battery including: an electrode assembly that includes a first electrode plate, a second electrode plate, and a separator interposed between the first and second electrode plates; a can that has a hexahedral shape, includes an opening on a side thereof to allow insertion of the electrode assembly, the can accommodating the electrode assembly therein; and a cap plate for sealing the opening of the can, wherein at least one corner unit of corner units of the can has a round shape, and an outer radius of curvature of the at least one corner unit having the round shape is greater than an inner radius of curvature thereof, and a thickness of a first surface that extends in a first direction is different from a thickness of a second surface that extends in a second direction.

Another aspect is a rechargeable battery including: an electrode assembly that comprises a first electrode plate, a second electrode plate, and a separator interposed between the first and second electrode plates; a can that has a hexahedral shape, includes an opening on a side thereof to allow insertion of the electrode assembly, the can accommodating the electrode assembly therein; and a cap plate that seals the opening of the can, wherein the can includes a bottom surface located on an opposite side to the cap plate, and a first side surface, a second side surface, a third side surface, and a fourth side surface that are located between the bottom surface and the cap plate and are approximately perpendicularly bent with respect to the bottom surface, and a corner unit formed at a location where at least one of the first side surface, the second side surface, the third side surface, and the fourth side surface abuts to the bottom surface has a round shape, and an outer radius of curvature of the corner unit is greater than an inner radius of curvature.

The can may include: a first corner unit that is formed at a location where the first side surface abuts to the bottom surface; a second corner unit that is formed at a location where the second side surface abuts to the bottom surface; a third corner unit that is formed at a location where the third side surface abuts to the bottom surface; and a fourth corner unit that is formed at a location where the fourth side surface abuts to the bottom surface.

The bottom surface may have a thickness greater than that of each of the first side surface, the second side surface, the third side surface, and the fourth side surface.

The first side surface and the second side surface may be parallel to each other, the third side surface and the fourth side surface may be parallel to each other, and outer radii of curvatures of the first and second corner units are respectively greater than inner radii of curvatures thereof.

The first and second side surfaces may have widths smaller than those of the third and fourth side surfaces.

The first side surface and the second side surface may be parallel to each other, the third side surface and the fourth side surface may be parallel to each other, and outer radii of curvatures of the third and fourth corner units are respectively greater than inner radii of curvatures thereof.

The inner radius of curvature may be in a range from about 0.4 mm to about 0.6 mm, and the outer radius of curvature may be in a range from about 1.0 mm to about 1.2 mm.

Another aspect is a rechargeable battery comprising: an electrode assembly that comprises a first electrode plate, a second electrode plate, and a separator interposed between the first and second electrode plates; a can having an opening and accommodating the electrode assembly therein, wherein the can comprises a plurality of corner units, wherein at least one of the corner units is rounded, and wherein the outer radius of curvature of the at least one corner unit is greater than the inner radius of curvature thereof; and a cap plate substantially sealing the opening of the can.

In the above battery, the at least one corner unit is at least one of corner units that surround a bottom of the can located on an opposite side to the cap plate. In the above battery, the can comprises a first side that extends in a first direction and a second side that extends in a second direction crossing the first direction, and wherein the thickness of the first side is greater than the thickness of the second side. In the above battery, the first side is a bottom of the can located opposite to the cap plate, and wherein the second side is a side that is located between the cap plate and the bottom of the can and is substantially perpendicularly bent with respect to the bottom.

In the above battery, the can has a substantially hexahedral shape and includes the opening that is formed at a position corresponding to an upper surface thereof, the can comprising: a bottom located on an opposite side to the cap plate; a first side that is located between the cap plate and the bottom and is substantially perpendicularly bent with respect to the bottom; a second side that is located between the cap plate and the bottom, is substantially perpendicularly bent with respect to the bottom, and faces the first side; a third side that is located between the cap plate and the bottom and is substantially perpendicularly bent with respect to the bottom; and a fourth side that is disposed between the cap plate and the bottom, is substantially perpendicularly bent with respect to the bottom, and faces the third side.

In the above battery, the bottom has a thickness greater than that of each of the first to fourth sides. In the above battery, the bottom has a thickness in a range from about 0.57 mm to about 0.63 mm, and wherein each of the first to fourth sides has a thickness in a range from about 0.28 mm to about 0.32 mm. In the above battery, the at least one corner unit comprises: a first corner unit that has a round shape, is formed at a location where the first side abuts to the bottom, and has an outer radius of curvature greater than an inner radius of curvature; and a second corner unit that has a round shape, is formed at a location where the second side abuts to the bottom, and has an outer radius of curvature greater than an inner radius of curvature.

In the above battery, the at least one corner unit further comprises: a third corner unit that has a round shape, is formed at a location where the third side abuts to the bottom, and has an outer radius of curvature greater than an inner radius of curvature; and a fourth corner unit that has a round shape, is formed at a location where the fourth side abuts to the bottom, and has an outer radius of curvature greater than an inner radius of curvature. In the above battery, the inner radius of curvature is in a range from about 0.4 mm to about 0.6 mm. In the above battery, the outer radius of curvature is in a range from about 1.0 mm to about 1.2 mm.

Another aspect is a rechargeable battery comprising: an electrode assembly that comprises a first electrode plate, a second electrode plate, and a separator interposed between the first and second electrode plates; a can that has a substantially hexahedral shape having an opening and accommodating the electrode assembly therein; and a cap plate substantially sealing the opening of the can, wherein the can comprises a plurality of corner units, wherein at least one of the corner units is rounded, wherein the outer radius of curvature of the at least one corner unit is greater than the inner radius of curvature thereof, wherein the can comprises a first side extending in a first direction and a second side extending in a second direction crossing the first direction, and wherein the thickness of the first side is different from the thickness of the second side.

Another aspect is a rechargeable battery comprising: an electrode assembly that comprises a first electrode plate, a second electrode plate, and a separator interposed between the first and second electrode plates; a can having a substantially hexahedral shape, wherein the can has an opening and accommodating the electrode assembly therein; and a cap plate substantially sealing the opening of the can, wherein the can comprises a bottom located on an opposite side to the cap plate, and a first side, a second side, a third side, and a fourth side that are located between the bottom and the cap plate and are substantially perpendicularly bent with respect to the bottom, wherein a corner unit formed at a location where at least one of the first to fourth sides abuts to the bottom is rounded, and wherein the outer radius of curvature of the corner unit is greater than the inner radius of curvature.

In the above battery, the can comprises: a first corner unit formed at a location where the first side abuts to the bottom; a second corner unit formed at a location where the second side abuts to the bottom; a third corner unit formed at a location where the third side abuts to the bottom; and a fourth corner unit formed at a location where the fourth side abuts to the bottom. In the above battery, the bottom has a thickness greater than that of each of the first to fourth sides. In the above battery, the first side and the second side are substantially parallel to each other, wherein the third side and the fourth side are substantially parallel to each other, and wherein an outer radius of each of curvatures of the first and second corner units is greater than an inner radius of each of curvatures thereof.

In the above battery, the first and second sides have widths less than those of the third and fourth sides. In the above battery, the first and second sides are substantially parallel to each other, wherein the third and fourth sides are substantially parallel to each other, and wherein an outer radius of each of curvatures of the third and fourth corner units is greater than an inner radius of each of curvatures thereof. In the above battery, the inner radius of curvature is in a range from about 0.4 mm to about 0.6 mm, and wherein the outer radius of curvature is in a range from about 1.0 mm to about 1.2 mm.

Another aspect is a rechargeable battery comprising: an electrode assembly comprising a first electrode plate, a second electrode plate and a separator interposed between the first and second electrode plates; and a can accommodating the electrode assembly therein, wherein the can comprises a plurality of corner units each being rounded, and wherein the outer radius of curvature of the corner unit is greater, than the inner radius of curvature thereof, wherein the can comprises a top and a bottom opposing each other and sides interposed between the top and bottom, and wherein the thickness of at least one of the sides is less than the thickness of the bottom of the can.

DETAILED DESCRIPTION

Figure 1:
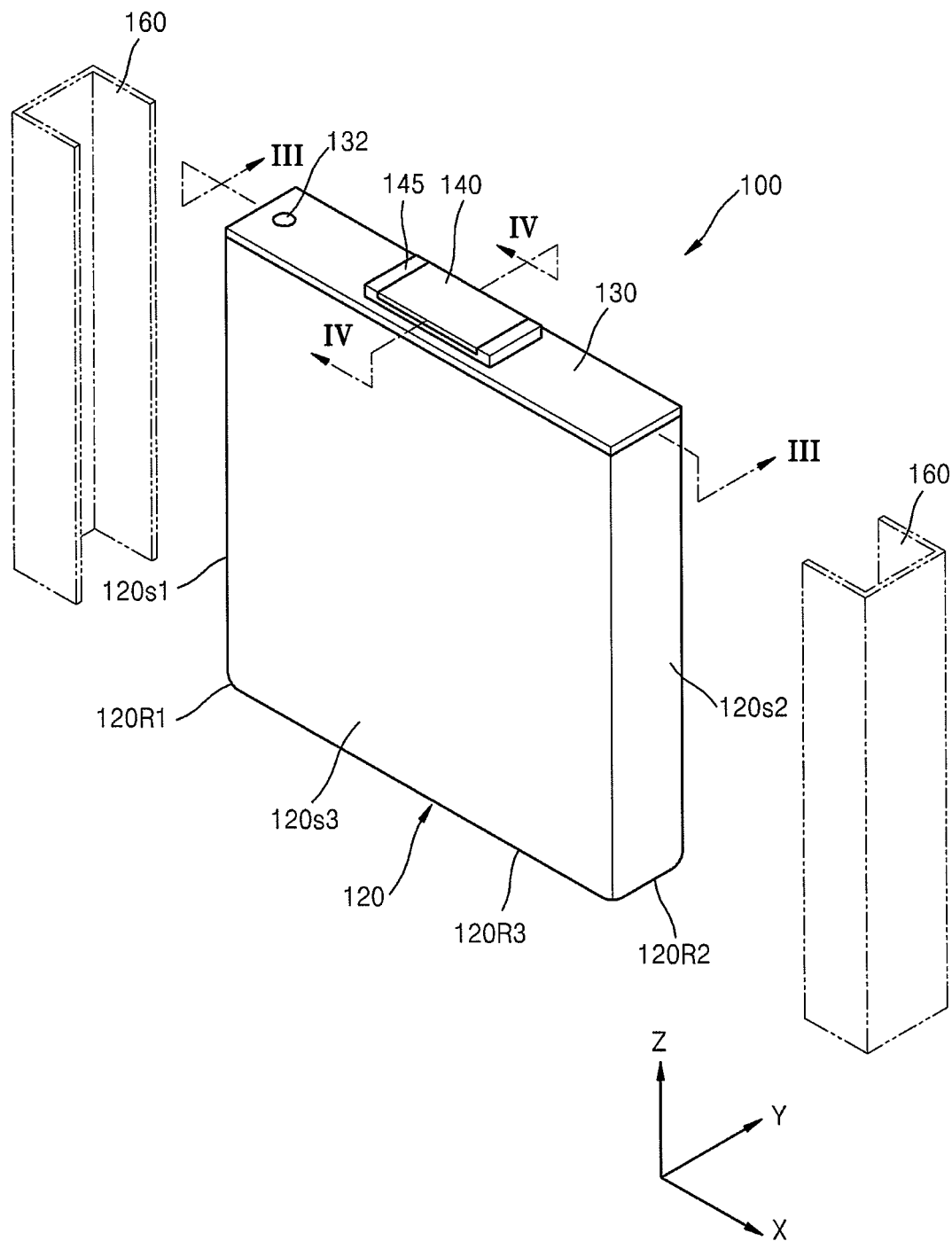
FIG. 1 is a schematic perspective view of a rechargeable battery according to an embodiment.

As rechargeable batteries are widely used in various fields, a test of their reliability according to particular usage environments has emerged as an important issue. Representative reliability test items include durability according to temperature, impact resistance, electrostatic discharge (ESD) protection, and charging and discharging, etc.

Of the above test items, the impact resistance affects not only mechanical characteristics of the rechargeable battery but also its operation. For example, if the rechargeable battery is damaged due to dropping or another significant external impact occurs, the result may be an electrical short circuit or electrolyte leakage. Accordingly, the rechargeable battery may be damaged to the point of being inoperable.

While various modifications and alternative forms may be applied to exemplary embodiments herein, these embodiments are shown by way of example in the drawings and will herein be described in detail. It should be understood, however, that there is no intent to limit the exemplary embodiments to the particular forms disclosed, but on the contrary, the exemplary embodiments are to cover all modifications, equivalents, and alternatives falling within the scope of the invention. It will be understood that, although the terms 'first', 'second', etc., may be used herein to describe various elements, these elements should not be limited by these terms. These terms are only used to distinguish one element from another. The terminologies used herein are for the purpose of describing embodiments only and are not intended to be limiting of exemplary embodiments. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. Also, the symbol "/" used below may be interpreted as "and" or "or" according to the circumstances.

In the drawings, the thicknesses of layers and regions may be exaggerated for clarity. Like reference numerals in the drawings denote like elements throughout.

When a constituent element is referred to as being "formed on or above", it can be directly formed on the other constituent element or an intervening elements may be present.

Figure 2:
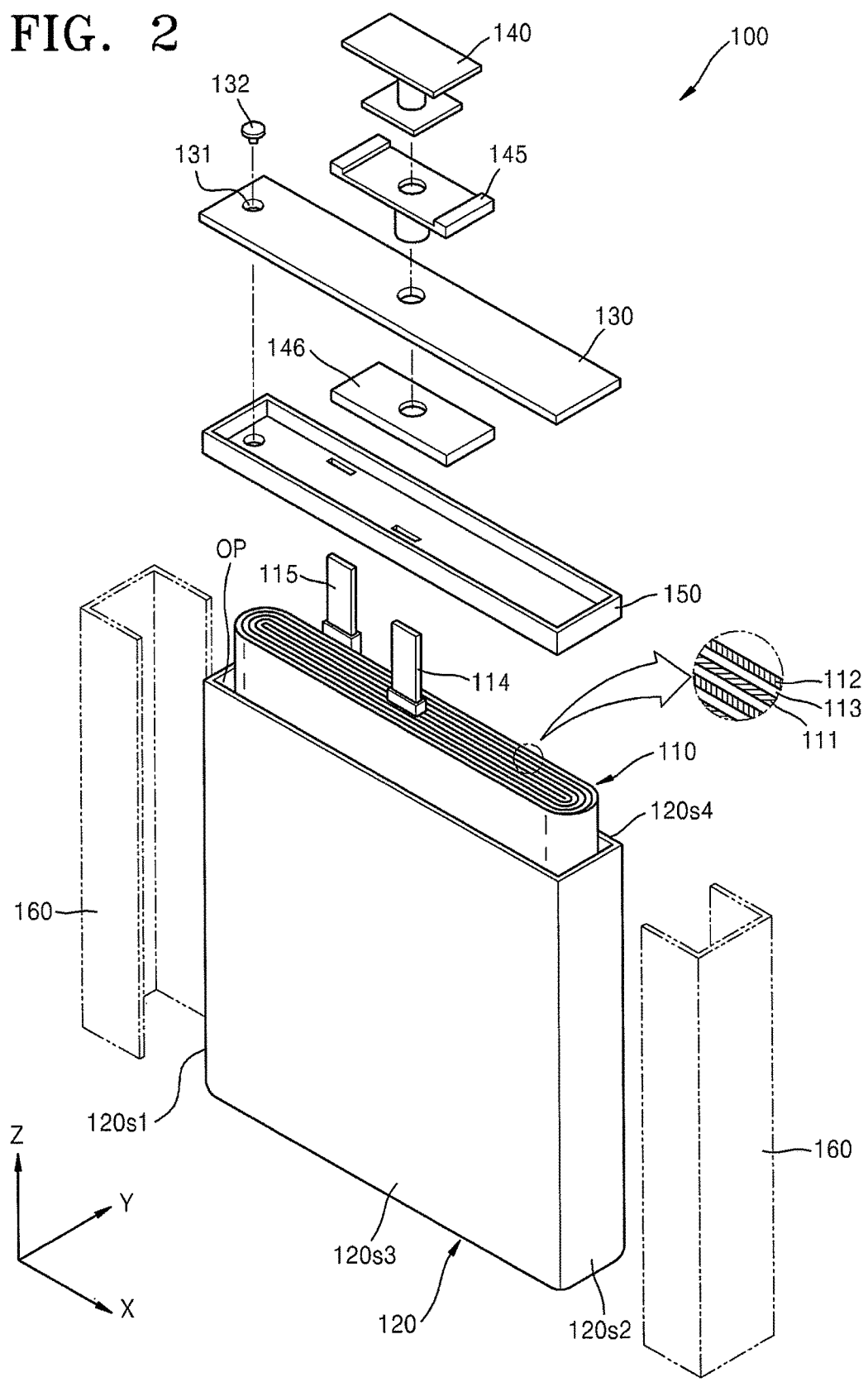
FIG. 2 is an exploded perspective view of the rechargeable battery of FIG. 1.
Figure 3:
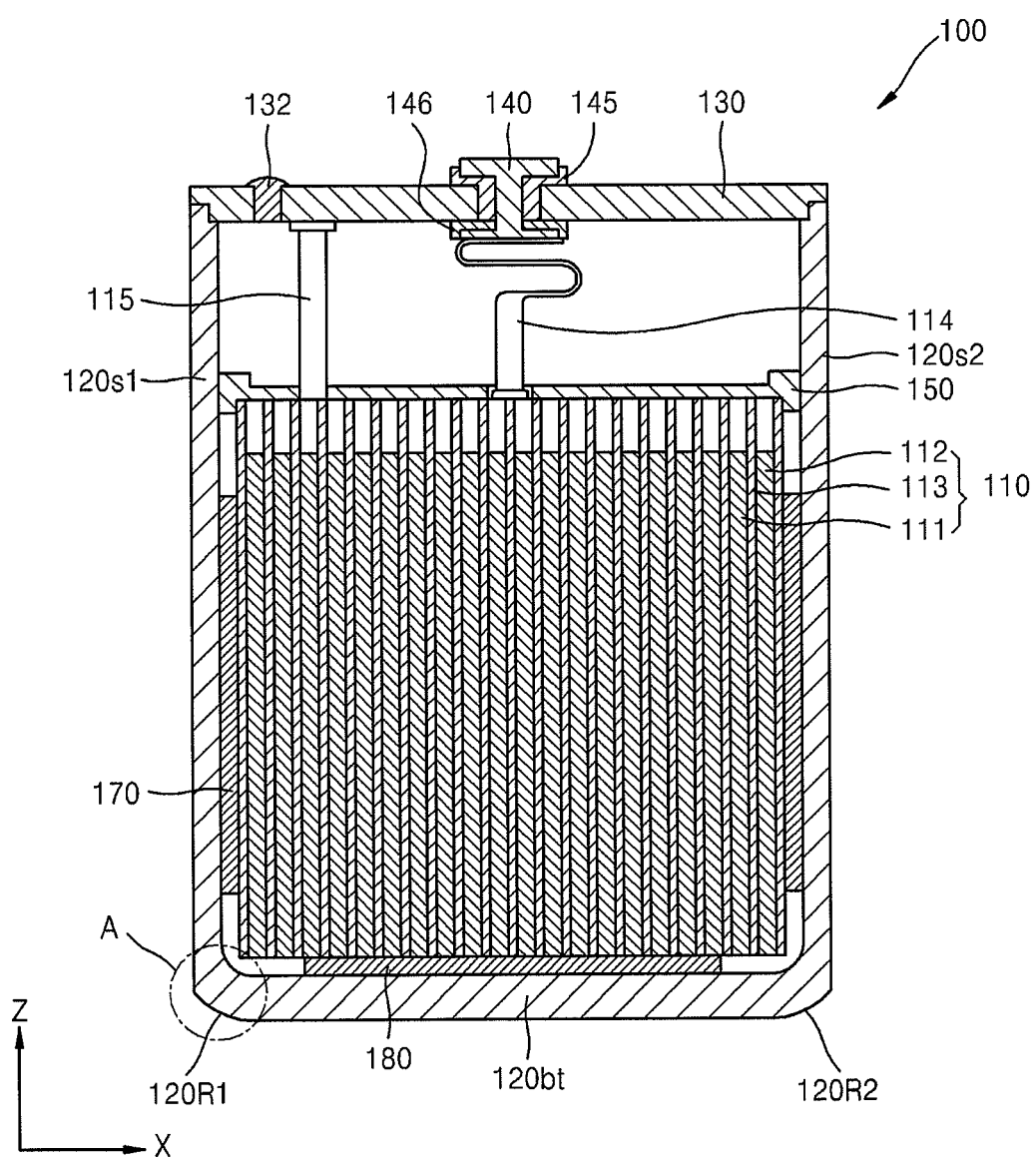
FIG. 3 is a cross-sectional view taken along a line III-III of FIG. 1.
Figure 4:
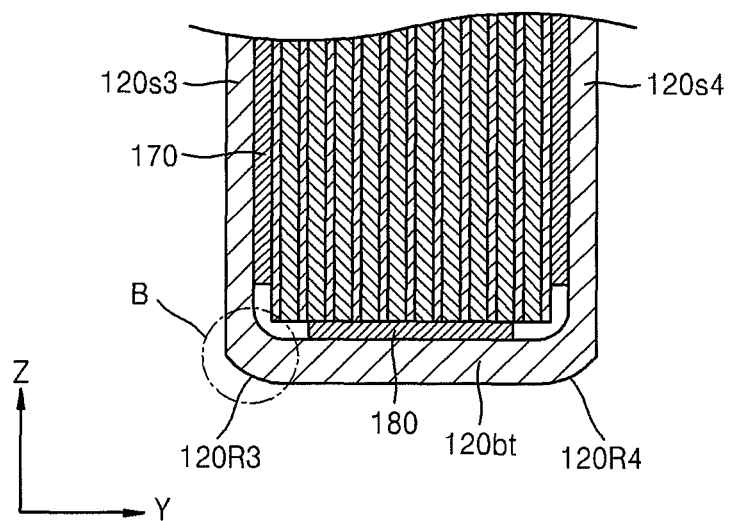
FIG. 4 is a cross-sectional view of a middle-lower part taken along a line IV-IV of FIG. 1

FIG. 1 is a schematic perspective view of a rechargeable battery 100 according to an embodiment. FIG. 2 is an exploded perspective view of the rechargeable battery of FIG. 1. FIG. 3 is a cross-sectional view taken along a line of FIG. 1. FIG. 4 is a cross-sectional view of a middle-lower part taken along a line IV-IV of FIG. 1.

Referring to FIGS. 1 through 3, the rechargeable battery 100 may include an electrode assembly 110, a can 120 that accommodates the electrode assembly 110, and a cap plate 130 that seals the can 120.

The electrode assembly 110 may include first and second electrode plates 111 and 112 on which an electrode active material is coated and a separator 113 interposed between the first and second electrode plate 111 and 112. The electrode assembly 110 may be formed by winding the first electrode plate 111, the separator 113, and the second electrode plate 112 that are stacked in the stated order into a jelly roll form. The first and second electrode plates 111 and 112 respectively are electrically connected to first and second electrode tabs 114 and 115 to discharge charges formed by a chemical reaction to the outside. The first and second electrode tabs 114 and 115 may extend in the same direction. For example, the first and second electrode tabs 114 and 115 may extend towards an opening OP of the can 120.

In the current embodiment, a case where the electrode assembly 110 has a jelly roll form is explained, but the present invention is not limited thereto. In another embodiment, the electrode assembly 110 may have a stack structure in which the electrode plates 111 and 112 and the separator 113 interposed therebetween are stacked.

In some embodiments, the can 120 has a substantially hexahedral shape, a surface corresponding to an upper surface of which is opened and may be formed of a metal material to ensure mechanical strength. For example, the can 120 may be formed of aluminum or an alloy of aluminum. The electrode assembly 110 soaked in an electrolyte may be accommodated inside the can 120. At this point, the electrode assembly 110 may be accommodated in the can 120 by being surrounded by an insulating sheet 170 to prevent the occurrence of an unnecessary short circuit with the can 120 formed of a metal material. After the electrode assembly 110 is accommodated in the can 120, the opening OP may be sealed by the cap plate 130. A portion where the cap plate 130 abuts to the can 120 may be combined by laser welding, and thus, air tightness of the inside of the can 120 may be maintained.

The cap plate 130 may include an electrolyte inlet 131. After the cap plate 130 and the can 120 are combined, an electrolyte is injected into the can 120 through the electrolyte inlet 131, and the electrolyte inlet 131 may be sealed by a stopper 132. As another embodiment, the cap plate 130 may not include the electrolyte inlet 131. In this case, an electrolyte may be filled in the can 120 before the cap plate 130 and the can 120 are combined to form one body by laser welding.

An electrode terminal 140 may be disposed on the cap plate 130. An upper surface of the electrode terminal 140 is exposed through an upper side of the cap plate 130, and a lower surface of the electrode terminal 140 faces inside the can 120 through the cap plate 130.

The cap plate 130 may be formed of a metal material as well as the can 120. As depicted in FIG. 3, the electrode terminal 140 may have a first polarity by being connected to the first electrode tab 114 of the electrode assembly 110, and the cap plate 130 may have a second polarity by being connected to the second electrode tab 115 of the electrode assembly 110. At this point, the can 120 that is connected to the cap plate 130 through welding may also have the second polarity.

For example, the cap plate 130 may be a positive electrode and the electrode terminal 140 may be a negative electrode of the rechargeable battery 100. At this point, first and second gaskets 145 and 146 that include an insulating material may be included between the cap plate 130 and the electrode terminal 140 in order to prevent a short circuit therebetween. The first gasket 145 may be disposed to contact an upper surface of the cap plate 130 and the second gasket 146 may be disposed to contact a lower surface of the cap plate 130. In FIG. 2, it is depicted that the first and second gaskets 145 and 146 are separated members, but the two gaskets 145 and 146 may be formed as one body. Meanwhile, insulating films 160 may be attached to and cover first and second sides 120s1 and 120s2 of the can 120 in order to electrically insulate the can 120 that has the second polarity through the welding to the cap plate 130 from an object of the outside or from another rechargeable battery.

A first insulating member 150 that is located on the electrode assembly 110 may be disposed in the can 120. The first insulating member 150 may insulate the electrode assembly 110 from the cap plate 130. In another embodiment, the first insulating member 150 may insulate the electrode assembly 110 from the cap plate 130 and also may fix the electrode assembly 110 so it does not move in the can 120. The first insulating member 150 includes through-holes so that the first and second electrode tabs 114 and 115 may extend towards the opening OP and includes a hole at a position corresponding to the electrolyte inlet 131 so that an electrolyte injected through the electrolyte inlet 131 may pass therethrough. A second insulating member 180 may be disposed on a lower surface of the electrode assembly 110 to prevent the occurrence of an unnecessary short circuit between the can 120 formed of a metal material and the electrode assembly 110.

As depicted in FIGS. 2 through 4, the can 120 includes an opening OP formed on a location corresponding to the upper surface of the can 120, and includes a bottom 120bt located on an opposite side of the opening OP, the first side 120s1, the second side 120s2, a third side 120s3, and a fourth side 120s4, which are located between the opening OP and the bottom 120bt and are substantially perpendicularly bent with respect to the bottom 120bt. The first and second sides 120s1 and 120s2 are formed substantially parallel to each other on opposite sides, and the third and fourth sides 120s3 and 120s4 are formed substantially parallel to each other on opposite sides. The can 120 may be manufactured in approximately a hexahedral shape, and in this case, the first and second sides 120s1 and 120s2 may have a width that is smaller than that of the third and fourth sides 120s3 and 120s4.

According to the current embodiment, a first corner unit 120R1 formed at a location where the first side 120s1 abuts to the bottom 120bt and a second corner unit 120R2 formed at a location where the second side 120s2 abuts to the bottom 120bt may be in a rounded state. That is, the first side 120s1 may extend in a z axis direction and the bottom 120bt may extend in a x axis direction with respect to the first corner unit 120R1 that is rounded, and the second side 120s2 may extend in the z axis direction and the bottom 120bt may extend in the x axis direction with respect to the second corner unit 120R2 that is rounded.

Also, a third corner unit 120R3 formed at a location where the third side 120s3 abuts to the bottom 120bt and a fourth corner unit 120R4 formed at a location where the fourth side 120s4 abuts to the bottom 120bt may be in a rounded state. That is, the third side 120s3 may extend in a z axis direction and the bottom 120bt may extend in a x axis direction with respect to the third corner unit 120R3 that is rounded, and the fourth side 120s4 may extend in the z axis direction and the bottom 120bt may extend in the x axis direction with respect to the fourth corner unit 120R4 that is rounded (see FIG. 4).

Hereinafter, a structure of the first and second corner units 120R1 and 120R2, and a structure of the third and fourth corner units 120R3 and 120R4 will be described.

Figure 5:
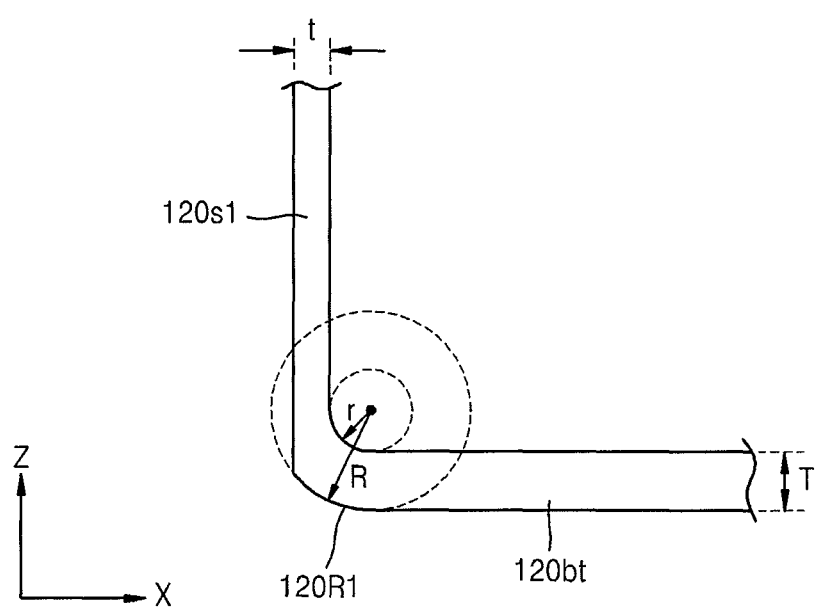
FIG. 5 is a magnified cross-sectional view of a portion A of FIG. 3.
Figure 6:
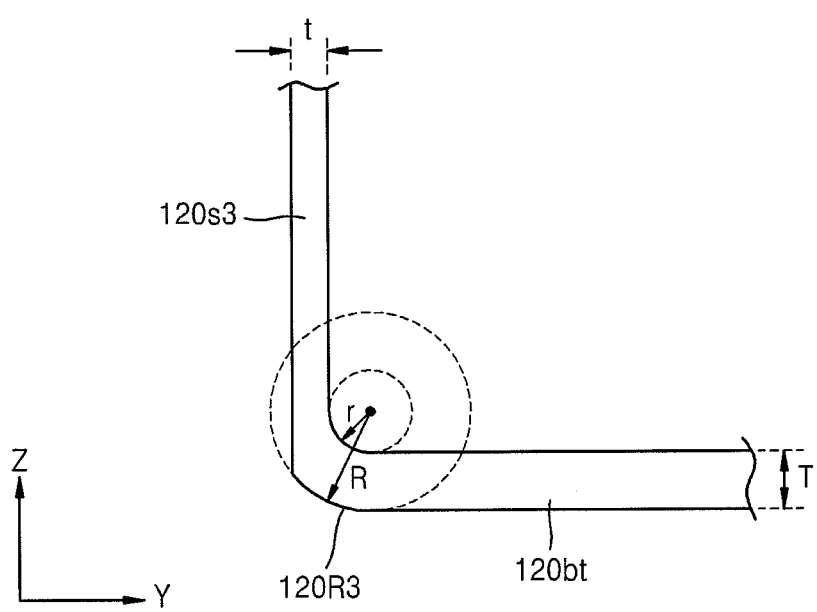
FIG. 6 is a magnified cross-sectional view of a portion B of FIG. 4.

FIG. 5 is a magnified cross-sectional view of portion A of FIG. 3, and FIG. 6 is a magnified cross-sectional view of portion B of FIG. 4.

The structure of the first and second corner units 120R1 and 120R2 will now be described in detail with reference to FIG. 5. The structure of the first corner unit 120R1 and that of the second corner unit 120R2 are substantially the same, and thus, the structure of the first corner unit 120R1 will be described and the description of the structure of the second corner unit 120R2 will be omitted.

Referring to FIG. 5, the first corner unit 120R1 is located where the first side 120s1 abuts to the bottom 120bt, and has a rounded shape as a whole. An outer radius of curvature R and an inner radius of curvature r of the first corner unit 120R1 have values that are different from each other. For example, the first corner unit 120R1 may have an outer radius of curvature R that is greater than an inner radius of curvature r thereof. That is, an outer curvature of the first corner unit 120R1 is smaller than an inner curvature of the first corner unit 120R1. For example, the outer radius of curvature R may be in a range from about 1.0 mm to about 1.2 mm, and the inner radius of curvature r may be in a range from about 0.4 mm to about 0.6 mm.

The first side 120s1 extends in the z axis direction and the bottom 120bt extends in the x axis direction with respect to the first corner unit 120R1. At this point, the bottom 120bt may have a thickness T greater than the thickness t of the first side 120s1. For example, the bottom 120bt may have a thickness T in a range from about 0.57 mm to about 0.63 mm, and the first side 120s1 may have a thickness t in a range from about 0.28 mm to about 0.32 mm, that is, the thickness T of the bottom 120bt may be approximately twice the thickness t of the first side 120s1.

When the rechargeable battery 100 is dropped on the ground, a corner unit may be easily damaged since the corner unit hits the ground first. For example, as in the current embodiment, if the rechargeable battery 100 has a hexahedral shape, there is a high possibility that the first and second corner units 120R1 and 120R2 formed on sides of the first and second sides 120s1 and 120s2 which have a narrow width may hit the ground first, and accordingly, the first and second corner units 120R1 and 120R2 may be easily damaged.

As a comparative example, a case when the outer radius of curvature R and the inner radius of curvature r of the first corner unit 120R1 are the same will now be described. When a tensile force is applied to the first corner unit 120R1 of the rechargeable battery 100 according to a comparative example due to a drop impact, a can may receive tensile forces in opposite directions with respect to the first corner unit 120R1, and thus, a metal material that constitutes a can is pulled away in opposite directions. Therefore, the can may rupture near the first corner unit 120R1.

However, in the case of the rechargeable battery 100 according to one embodiment, the outer radius of curvature R is formed greater than the inner radius of curvature r of the first corner unit 120R1. Thus, a force being applied to the first corner unit 120R1 is primarily distributed at an outer side of the can 120 having a large radius of curvature, and thus, the pulling force in opposite directions of the metal material that constitutes the can 120 due to a tensile force may be minimized.

For example, when the thickness T of the bottom 120bt is greater than the thickness t of the first side 120s1, although the metal material that constitutes the can 120 is pulled away in opposite directions by a tensile force applied to the first corner unit 120R1, the metal material that constitutes the bottom 120bt having a relatively large thickness T may fill the portion that is pulled away, and thus, rupturing of the can 120 may be prevented.

The structure of the third and fourth corner units 120R3 and 120R4 will be described in detail with reference to FIG. 6. The third and fourth corner units 120R3 and 120R4 have substantially the same structure, and thus, the structure of the third corner unit 120R3 will be described and the description of the structure of the fourth corner unit 120R4 will be omitted.

Referring to FIG. 6, the third corner unit 120R3 is located where the third side 120s3 abuts to the bottom 120bt, and has a rounded shape as a whole. An outer radius of curvature R and an inner radius of curvature r of the third corner unit 120R3 have values that are different from each other. For example, the third corner unit 120R3 may have an outer radius of curvature R that is greater than an inner radius of curvature r thereof. That is, an outer curvature of the third corner unit 120R3 is smaller than an inner curvature of the third corner unit 120R3. For example, the outer radius of curvature R may be in a range from about 1.0 mm to about 1.2 mm, and the inner radius of curvature r may be in a range from about 0.4 mm to about 0.6 mm.

The third side 120s3 extends in the z axis direction and the bottom 120bt extends in the x axis direction with respect to the third corner unit 120R3. At this point, the bottom 120bt may have a thickness T greater than the thickness t of the third side 120s3. For example, the bottom 120bt may have a thickness T in a range from about 0.57 mm to about 0.63 mm, and the third side 120s3 may have a thickness t in a range from about 0.28 mm to about 0.32 mm, that is, the thickness T of the bottom 120bt may be approximately twice the thickness t of the third side 120s3.

When the rechargeable battery 100 is dropped on the ground, a corner unit may be easily damaged since the corner unit hits the ground first.

As a comparative example, a case when the outer radius of curvature R and the inner radius of curvature r of the third corner unit 120R3 are the same will now be described. When a tensile force is applied to the third corner unit 120R3 of the rechargeable battery 100 according to a comparative example due to a drop impact, a can may receive tensile forces in opposite directions with respect to the third corner unit 120R3, and thus, a metal material that constitutes the can is pulled away in opposite directions. Therefore, the can may rupture near the third corner unit 120R3.

However, in the case of the rechargeable battery 100 according to one embodiment, the outer radius of curvature R is formed greater than the inner radius of curvature r of the third corner unit 120R3. Thus, a force being applied to the third corner unit 120R3 is primarily distributed at an outer side of the can 120 having a large radius of curvature, and thus, the pulling away in opposite directions of the metal material that constitutes the can 120 due to a tensile force may be minimized.

For example, when the thickness T of the bottom 120bt is greater than the thickness t of the third side 120s3, although the metal material that constitutes the can 120 is pulling away by a tensile force applied to the third corner unit 120R3, the metal material that constitutes the bottom 120bt having a relatively large thickness T may fill the portion that is pulling away, and thus, rupturing of the can 120 may be prevented.

In the current embodiment, a case where the first through fourth corner units 120R1 through 120R4 all have rounded shapes is described, but the present invention is not limited thereto. According to another embodiment, only the first and second corner units 120R1 and 120R2 may have a rounded shape in which an outer radius of curvature is greater than an inner radius of curvature. Also, according to another embodiment, only the third and fourth corner units 120R3 and 120R4 may have a rounded shape in which an outer radius of curvature is greater than an inner radius of curvature.

According to some embodiments, an outer radius of curvature of each of the corner units is formed greater than an inner radius of curvature to form a curvature of an inner side surface of the corner unit greater than that of an outer side surface, and thus, a physical strength of the can may be ensured. Also, the bottom has a thickness greater than that of the sides, and accordingly, the physical strength of the can may further be increased. Accordingly, although the rechargeable battery is dropped on the ground or an external impact is applied to the rechargeable battery, the rupture of the can due to a tensile strength being applied to the corner units may be effectively prevented.

It should be understood that the above described embodiments should be considered in a descriptive sense only and not for purposes of limitation. Descriptions of features or aspects within each embodiment should typically be considered as available for other similar features or aspects in other embodiments.

What is claimed is:

1. A rechargeable battery comprising:
   an electrode assembly that comprises a first electrode plate, a second electrode plate, and a separator interposed between the first and second electrode plates;

a can having an opening and accommodating the electrode assembly therein, wherein the can comprises a plurality of corner units, wherein at least one of the corner units is rounded and includes an inner side and an outer side, and wherein the outer side radius of curvature of the at least one corner unit is greater than the inner side radius of curvature thereof; and a cap plate substantially sealing the opening of the can, wherein an inner circle defined by the inner side radius of curvature and an outer circle defined by the outer side radius of curvature are concentric, wherein the inner side radius of curvature is in a range from about 0.4 mm to about 0.6 mm, wherein the outer side radius of curvature is in a range from 1.0 mm to about 1.2 mm, wherein the can comprises a bottom located on an opposite side to the cap plate and a side that is located between the bottom and the cap plate, wherein the bottom has a thickness in a range from 0.57 mm to 0.63 mm, and wherein the side has a thickness in a range from about 0.28 mm to about 0.32 mm.

2. The rechargeable battery of claim 1, wherein the at least one corner unit is at least one of corner units that surround the bottom of the can located on an opposite side to the cap plate.

3. The rechargeable battery of claim 1, wherein the first side is the bottom of the can located opposite to the cap plate, and wherein the second side is a side that is located between the cap plate and the bottom of the can and is substantially perpendicularly bent with respect to the bottom.

4. The rechargeable battery of claim 1, wherein the can has a substantially hexahedral shape and includes the opening that is formed at a position corresponding to an upper surface thereof, the side of the can comprising:
   a first side that is located between the cap plate and the bottom and is substantially perpendicularly bent with respect to the bottom;
   a second side that is located between the cap plate and the bottom, is substantially perpendicularly bent with respect to the bottom, and faces the first side;
   a third side that is located between the cap plate and the bottom and is substantially perpendicularly bent with respect to the bottom; and
   a fourth side that is disposed between the cap plate and the bottom, is substantially perpendicularly bent with respect to the bottom, and faces the third side.

5. The rechargeable battery of claim 4, wherein the at least one corner unit comprises:
   a first corner unit that has a round shape, is formed at a location where the first side abuts to the bottom, and has an outer side radius of curvature greater than an inner side radius of curvature; and
   a second corner unit that has a round shape, is formed at a location where the second side abuts to the bottom, and has an outer side radius of curvature greater than an inner side radius of curvature.

6. The rechargeable battery of claim 5, wherein the at least one corner unit further comprises:
   a third corner unit that has a round shape, is formed at a location where the third side abuts to the bottom, and has an outer side radius of curvature greater than an inner side radius of curvature; and
   a fourth corner unit that has a round shape, is formed at a location where the fourth side abuts to the bottom, and has an outer side radius of curvature greater than an inner side radius of curvature.

7. The rechargeable battery of claim 1, wherein the inner side radius of curvature is about 0.6 mm.

8. A rechargeable battery comprising:
   an electrode assembly that comprises a first electrode plate, a second electrode plate, and a separator interposed between the first and second electrode plates;
   a can having an opening and accommodating the electrode assembly therein, wherein the can comprises a plurality of corner units, wherein at least one of the corner units is rounded and includes an inner side and an outer side, wherein the outer side radius of curvature of the at least one corner unit is greater than the inner side radius of curvature thereof, and wherein an inner circle defined by the inner side radius of curvature and an outer circle defined by the outer side radius of curvature are concentric; and
   a cap plate substantially sealing the opening of the can, wherein the can has a substantially hexahedral shape and includes the opening that is formed at a position corresponding to an upper surface thereof, the can comprising:
   a bottom located on an opposite side to the cap plate;
   a first side that is located between the cap plate and the bottom and is substantially perpendicularly bent with respect to the bottom;
   a second side that is located between the cap plate and the bottom, is substantially perpendicularly bent with respect to the bottom, and faces the first side;
   a third side that is located between the cap plate and the bottom and is substantially perpendicularly bent with respect to the bottom; and
   a fourth side that is disposed between the cap plate and the bottom, is substantially perpendicularly bent with respect to the bottom, and faces the third side,
   wherein the bottom has a thickness in a range from 0.57 mm to 0.63 mm, and wherein each of the first to fourth sides has a thickness in a range from about 0.28 mm to about 0.32 mm.

9. A rechargeable battery comprising:
   an electrode assembly that comprises a first electrode plate, a second electrode plate, and a separator interposed between the first and second electrode plates;
   a can accommodating the electrode assembly therein, wherein the can comprises a plurality of corner units each being rounded and including an inner side and an outer side, and wherein the outer side radius of curvature of each corner unit is greater than the inner side radius of curvature thereof, wherein the can comprises a top and a bottom opposing each other and sides interposed between the top and bottom, and wherein the thickness of at least one of the sides is different from the thickness of the bottom of the can; and
   a cap plate substantially sealing an opening at the top of the can,
   wherein an inner circle defined by the inner side radius of curvature and an outer circle defined by the outer side radius of curvature are concentric, wherein the inner side radius of curvature is in a range from about 0.4 mm to about 0.6 mm, wherein the outer side radius of curvature is in a range from 1.0 mm to about 1.2 mm,
   wherein the bottom of the can has a thickness in a range from 0.57 mm to 0.63 mm, and wherein each of the sides has a thickness in a range from about 0.28 mm to about 0.32 mm.

10. A rechargeable battery comprising:
an electrode assembly that comprises a first electrode plate, a second electrode plate, and a separator interposed between the first and second electrode plates;
a can having a substantially hexahedral shape, wherein the can has an opening and accommodating the electrode assembly therein; and
a cap plate substantially sealing the opening of the can,
wherein the can comprises a bottom located on an opposite side to the cap plate, and a first side, a second side, a third side, and a fourth side that are located between the bottom and the cap plate and are substantially perpendicularly bent with respect to the bottom,
wherein a corner unit formed at a location where at least one of the first to fourth sides abuts to the bottom is rounded and includes an inner side and an outer side, wherein the outer side radius of curvature of the corner unit is greater than the inner side radius of curvature,
wherein an inner circle defined by the inner side radius of curvature and an outer circle defined by the outer side radius of curvature are concentric, wherein the inner side radius of curvature is in a range from about 0.4 mm to about 0.6 mm, wherein the outer side radius of curvature is in a range from 1.0 mm to about 1.2 mm,
wherein the bottom of the can has a thickness in a range from 0.57 mm to 0.63 mm, and wherein each of the first to fourth sides has a thickness in a range from about 0.28 mm to about 0.32 mm.

11. The rechargeable battery of claim 10, wherein the can comprises:
a first corner unit formed at a location where the first side abuts to the bottom;
a second corner unit formed at a location where the second side abuts to the bottom;
a third corner unit formed at a location where the third side abuts to the bottom; and
a fourth corner unit formed at a location where the fourth side abuts to the bottom.

12. The rechargeable battery of claim 11, wherein the first side and the second side are substantially parallel to each other, wherein the third side and the fourth side are substantially parallel to each other, and wherein an outer side radius of each of curvatures of the first and second corner units is greater than an inner side radius of each of curvatures thereof.

13. The rechargeable battery of claim 12, wherein the first and second sides have widths less than those of the third and fourth sides.

14. The rechargeable battery of claim 11, wherein the first and second sides are substantially parallel to each other, wherein the third and fourth sides are substantially parallel to each other, and wherein an outer side radius of each of curvatures of the third and fourth corner units is greater than an inner side radius of each of curvatures thereof.

* * * * *